Sept. 19, 1933.   F. H. McCULLOUGH   1,927,241
FAIR LEAD PULLEY
Filed Aug. 18, 1931   2 Sheets-Sheet 1
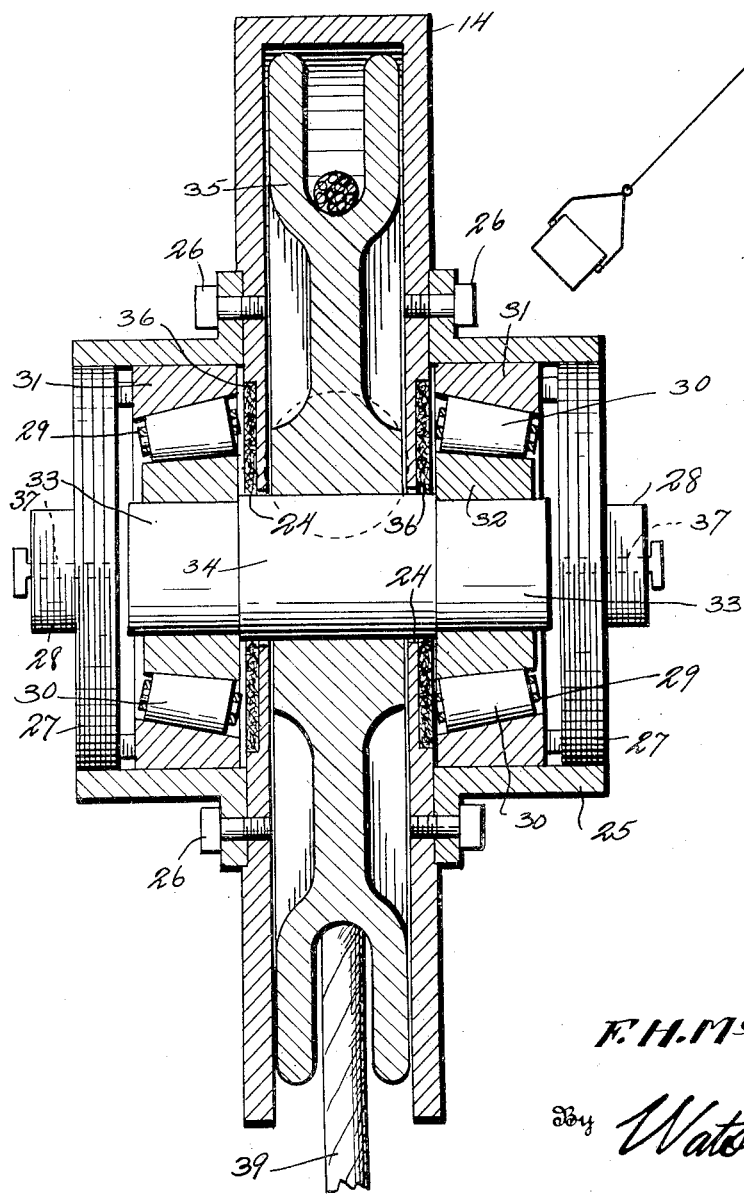

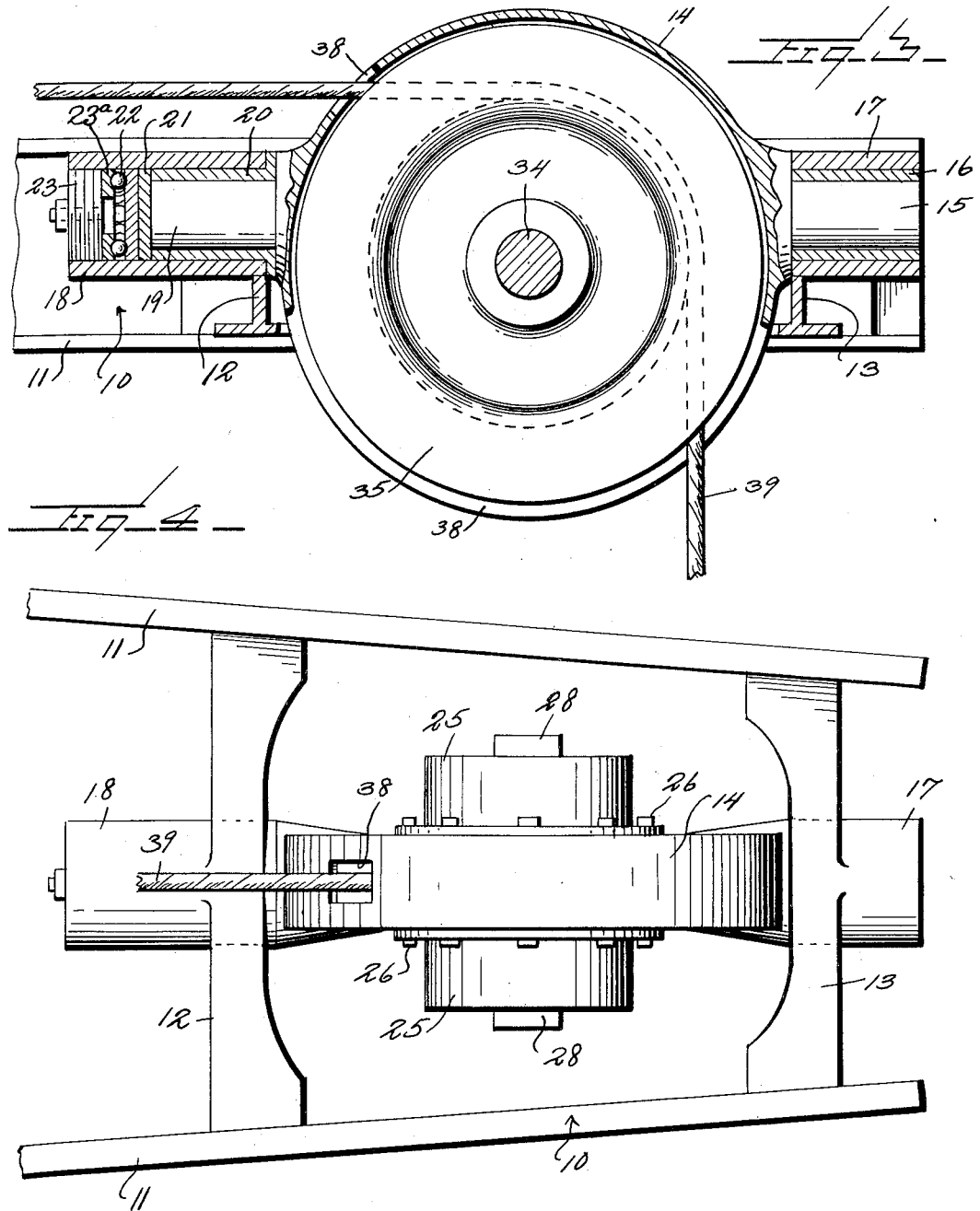

Patented Sept. 19, 1933

1,927,241

UNITED STATES PATENT OFFICE 1,927,241

FAIR LEAD PULLEY

Fred H. McCullough, Sacramento, Calif.

Application August 18, 1931. Serial No. 557,869

3 Claims. (Cl. 254—190)

This invention relates to pulleys and particularly designed to be used as a "fair lead" pulley on a swinging boom or derrick, though the invention is not limited to the use of this pulley in this position.

The general object of the invention is to provide a pulley or sheave that will permit the rope or cable passing over the pulley to swing freely laterally and thus follow the bucket as the boom swings from side to side, thus permitting the cable to run straight through the pulley and avoiding wear and tear incident to a cable extending at an angle to the pulley and extending over the wall of the pulley groove.

A further object is to provide a pulley of this character in which the pulley proper is mounted within the pulley housing on anti-friction bearings of a very simple character, permitting the pulley to be readily oiled.

Other objects will appear in the course of the following description.

My invention is illustrated in the accompanying drawings, wherein:—

Figure 1 is a diagrammatic front elevation of a derrick with a boom at an inclination and my fair lead pulley applied to the boom;

Figure 2 is a radial section through the pulley housing;

Figure 3 is a longitudinal section through the pulley housing and bearings;

Figure 4 is a plan view of the outer end of the boom and pulley.

Referring to the drawings, 10 designates a derrick boom or other like element, the derrick boom being mounted for the usual vertical swinging movement and for lateral swinging movement. The derrick boom, as illustrated, consists of the two longitudinal elements 11 intersected at their ends by the two transverse elements 12 and 13. The pulley casing or housing 14 is mounted on trunnions at its upper and lower ends on these transverse members 12 and 13 and the pulley is mounted in the casing on transverse trunnions, the vertically disposed or longitudinally disposed trunnions permitting the pulley housing or supporting structure to swing laterally.

As illustrated in detail, the pulley housing 14 is provided with the trunnions 15 and 19. The uppermost of these trunnions 15 operates within a brass bushing 16 carried within a bearing 17 extending upward from the transversely extending casting 13. The lowermost casting 12 has formed with it the tubular bearing 18 and the trunnion 19 of the pulley housing 14 extends into a brass bushing 20 disposed within the tubular bearing 18. The end of the trunnion 19 bears against bearing plates 21 which in turn bear against anti-friction bearings 22.

In the extremity of the tubular bearing 18, there is disposed a screw-threaded plug 23 which bears against an annular plate 23a which in turn bears against the anti-friction elements 22. Thus the pulley housing is mounted for oscillatory movement on an axis extending longitudinally of the boom. As shown in Figure 3, the housing 14 is formed with enlarged recesses 24 in its sides and attached to each side of the housing is a bearing box 25 held in place by the screws 26. The outer end of each bearing box is internally screw-threaded for the reception of an externally screw-threaded plug or cap 27 having a lug 28 whereby it may be rotated by a wrench into or out of position. Disposed within the bearing box is a cage 29 carrying the anti-friction rollers 30. These rollers bear against external race ring 31 and against an internal race ring 32. This internal race ring is carried upon the trunnion 33 of the pulley shaft 34 upon which the pulley 35 is mounted. Each trunnion 33 is considerably smaller, of course, than a recess 24 and a felt gasket 36 is disposed within this opening or recess. The inner face of the plug or cap 27 is formed with an annular rib bearing against the outer race and thus the outer race may be adjusted inward from time to time to take up wear. The cap is provided with a duct 37 whereby the bearing may be lubricated. Of course the housing 14 is formed with an aperture 38 through which the cable 39 passes.

While I have designed this sheave or pulley with special reference to its use on swinging booms or derricks, I do not wish to be limited to this as a swivel pulley of this character may be applied to other devices and wherever a swivel pulley may conveniently displace a stationary pulley so that the pulley may swing to lateral movements of the cable to thus permit the cable to run in a straight line at all times and prevent its running over the edge of the pulley or sheave. When this pulley or sheave is used in connection with a boom, it is obvious that the pulley will swing on its longitudinal axis in conformity with the swinging of the bucket or derrick line. This not only reduces very greatly the wear and tear on the cable but it prevents all chance of the cable running off of the pulley and jamming.

It is to be noted that my sheave is hung so that the axis of the pulley or sheave itself is only slightly below the axis of the trunnions so that the upper portion of the pulley and of the housing balances to some extent the lower portion of the pulley or housing. As a result of this, the sheave or pulley 35 will not "ride" on the cable when the pulley is turned angularly upon the trunnions 15 and 19. Were the trunnions 15 and 19 disposed in line with the upper portion of the housing 14, the relatively heavy weight of the lower portion of the pulley below the trunnions would tend to cause it to swing to a vertical position and the cable as a consequence rides against the outer flange of the pulley, causing great friction and great wear. This wear is very great because of the fact that these sheaves weigh in the neighborhood of 150 to 250 lbs. With my pulley having the trunnions disposed on a line, only slightly above the axis of the pulley 35, there will be no creeping of the cable to the upper edge or any other edge of the flange to the pulley itself.

Attention is called to the fact that the longitudinal trunnions of this pulley are off center so that the sheave will automatically swing back to its normal position when strain upon the cable is released. The felt casings 36 are, of course, for the purpose of retaining oil or grease and to make the bearings dust-proof.

While I have illustrated certain details of construction and arrangements of parts which I have found to be particularly effective, I do not wish to be limited to these, as obviously the structure might be varied in some respects without departing from the spirit of the invention as defined in the appended claims.

I claim:—

1. As an article of manufacture, a pulley housing, having side walls, each formed with a central shaft opening, cylindrical extensions attached to said side walls extending laterally therefrom concentric to said central opening, the ends of said extensions being interiorly screw-threaded, pulley shaft bearings mounted within said extensions and outward of the walls of the pulley housing, screw-threaded caps engaging the ends of said extensions whereby access may be had to the anti-friction bearings, and means disposed in the walls of the housing and within the tubular extensions whereby to retain lubricant within the extensions.

2. A supporting element having transversely extending spaced members, each formed with a bearing, a pulley housing having trunnions engaging said bearings, the housing having side walls, each formed with a central shaft opening, cylindrical extensions extending from said side walls concentric to said central opening, the ends of the extensions being interiorly screw-threaded, pulley shaft bearings mounted within said extensions and outward of the walls of the pulley housing, and screw-threaded caps engaging the ends of said extensions, the pulley housing walls being annularly recessed around the shaft openings, and annular packing members disposed within the recesses and bearing against the pulley shaft whereby to retain lubricant within said extensions.

3. A supporting element having transversely extending spaced members, each formed with a tubular bearing, a pulley housing having trunnions extending into said tubular bearings, bushings surrounding said trunnions, an anti-friction thrust bearing carried by the inner one of said bearings, laterally disposed bearings carried by the pulley housing, and a pulley mounted within the housing and having a shaft engaging in the last-named bearings, the axis of the trunnions being disposed on a line slightly above the shaft of the pulley and below the top of the pulley housing and pulley therein.

FRED H. McCULLOUGH.